(12) United States Patent
Goto

(10) Patent No.: US 11,461,730 B2
(45) Date of Patent: Oct. 4, 2022

(54) IN-VEHICLE DEVICE, ARRIVAL NOTIFICATION SYSTEM, AND ARRIVAL NOTIFICATION METHOD

(71) Applicant: Yazaki Corporation, Tokyo (JP)

(72) Inventor: Jun Goto, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 64 days.

(21) Appl. No.: 16/840,542

(22) Filed: Apr. 6, 2020

(65) Prior Publication Data
US 2020/0356947 A1 Nov. 12, 2020

(30) Foreign Application Priority Data
May 8, 2019 (JP) .............................. JP2019-088293

(51) Int. Cl.
*G06Q 10/08* (2012.01)
*H04W 4/48* (2018.01)
*G01C 21/36* (2006.01)

(52) U.S. Cl.
CPC ..... *G06Q 10/0833* (2013.01); *G01C 21/3605* (2013.01); *G06Q 10/0832* (2013.01); *G06Q 10/0836* (2013.01); *H04W 4/48* (2018.02)

(58) Field of Classification Search
CPC ..... H04W 84/12; H04W 12/06; H04W 4/021; H04W 12/062; G06Q 10/08; G06Q 50/28
See application file for complete search history.

(56) References Cited

U.S. PATENT DOCUMENTS

| | | | | |
|---|---|---|---|---|
| 5,400,020 | A * | 3/1995 | Jones | G08G 1/123 340/992 |
| 5,648,770 | A | 7/1997 | Ross | |
| 7,999,701 | B1 * | 8/2011 | Xu | G08G 1/127 340/993 |
| 8,682,363 | B1 * | 3/2014 | Cardi | H04W 4/02 455/456.3 |
| 2003/0146854 | A1 * | 8/2003 | Jones | G06Q 10/08 340/988 |
| 2018/0190062 | A1 * | 7/2018 | Robinson | G06Q 10/0838 |
| 2018/0351941 | A1 * | 12/2018 | Chhabra | H04L 9/38 |
| 2019/0152376 | A1 * | 5/2019 | Schwartz | G06Q 10/04 |
| 2019/0279151 | A1 * | 9/2019 | Felice | G07C 9/257 |

FOREIGN PATENT DOCUMENTS

| | | |
|---|---|---|
| JP | 2004-220100 A | 8/2004 |
| JP | 2018-70334 A | 5/2018 |
| KR | 10-2017-0011698 A | 2/2017 |

* cited by examiner

*Primary Examiner* — Victoria E. Frunzi
*Assistant Examiner* — Robert Fredeking
(74) *Attorney, Agent, or Firm* — Sughrue Mion, PLLC

(57) ABSTRACT

An objective of the present invention is to provide an in-vehicle device, an arrival notification system and an arrival notification method which can enable an arrival of the vehicle to be easily recognized by a user. The objective is achieved by causing a notification device with a communication function to generate a notification sound when the vehicle arrives at a delivery target, which can enable an arrival of the vehicle to be easily recognized by the user. I.e., this can cause the notification device to generate the notification sound more easily and it can be recognized by users more easily than an arrival notification method by merely sending an electronic mail.

11 Claims, 2 Drawing Sheets

IN-VEHICLE DEVICE, ARRIVAL NOTIFICATION SYSTEM, AND ARRIVAL NOTIFICATION METHOD

BACKGROUND OF THE INVENTION

Technical Field

The present invention relates to an in-vehicle device, an arrival notification system and an arrival notification method.

Conventionally, an arrival notification method is proposed in which a user is notified of an estimated arrival time of a delivery truck by means of a receiver and a mobile phone which are on board of the delivery truck (e.g. see Patent Document 1). In the arrival notification method according to Patent Document 1, an arrival prenotice electronic mail is transmitted to a user terminal at departure of the delivery truck by receiving an RF signal with the receiver from an area antenna within a delivery center. Further, a new estimated arrival time is determined by receiving an RF signal with the receiver from an antenna at a delivery route to transmit the arrival prenotice electronic mail again to the user terminal.

CITATION LIST

Patent Literature

Patent Literature 1: JP 2004-220100 A

SUMMARY OF THE INVENTION

However, with the arrival notification method according to Patent Document 1, the user may not notice the electronic mail e.g. if an output volume of the user terminal is zero, such as a so-called silent mode and/or a flight mode. In a delivery form where it is notified that an unmanned delivery vehicle has arrived at a delivery target, or where it is notified without the passenger getting off that a manned delivery vehicle has arrived at a delivery target, the delivery goods cannot be received when the user is not aware of the electronic mail.

An objective of the present invention is to provide an in-vehicle device, an arrival notification system and an arrival notification method which can enable an arrival of the vehicle to be easily recognized by a user.

An in-vehicle device according to the present invention includes a storage unit for storing destination information, a position information acquiring unit for acquiring own position information, a communication unit capable of communicating with a notification device with a communication function located at a destination, and a control unit for causing the notification device with the communication function to generate a notification sound by causing the communication unit to transmit a first arrival signal to the notification device with the communication function at a predetermined destination when arriving at the predetermined destination.

With such an in-vehicle device according to the present invention, an arrival of the vehicle can be easily recognized by the user by causing the notification device to generate the notification sound when the vehicle arrives at the destination. It is to be noted that the term "notification device with a communication function" means a device which is provided for generating sounds and waits being ready for sound generation, wherein the notification device includes e.g. a home intercom and/or a landline telephone. Further, the first arrival signal may be transmitted at any time after the communication unit and the notification device have been enabled to communicate, e.g. before or after the vehicle stops at the destination. In other words, the term "arrive" is not limited to the vehicle stopping, but may also include the vehicle entering an area within a predetermined range from a building or the like as the destination.

DETAILED DESCRIPTION OF THE PREFERRED EMBODIMENTS

Figure 1:
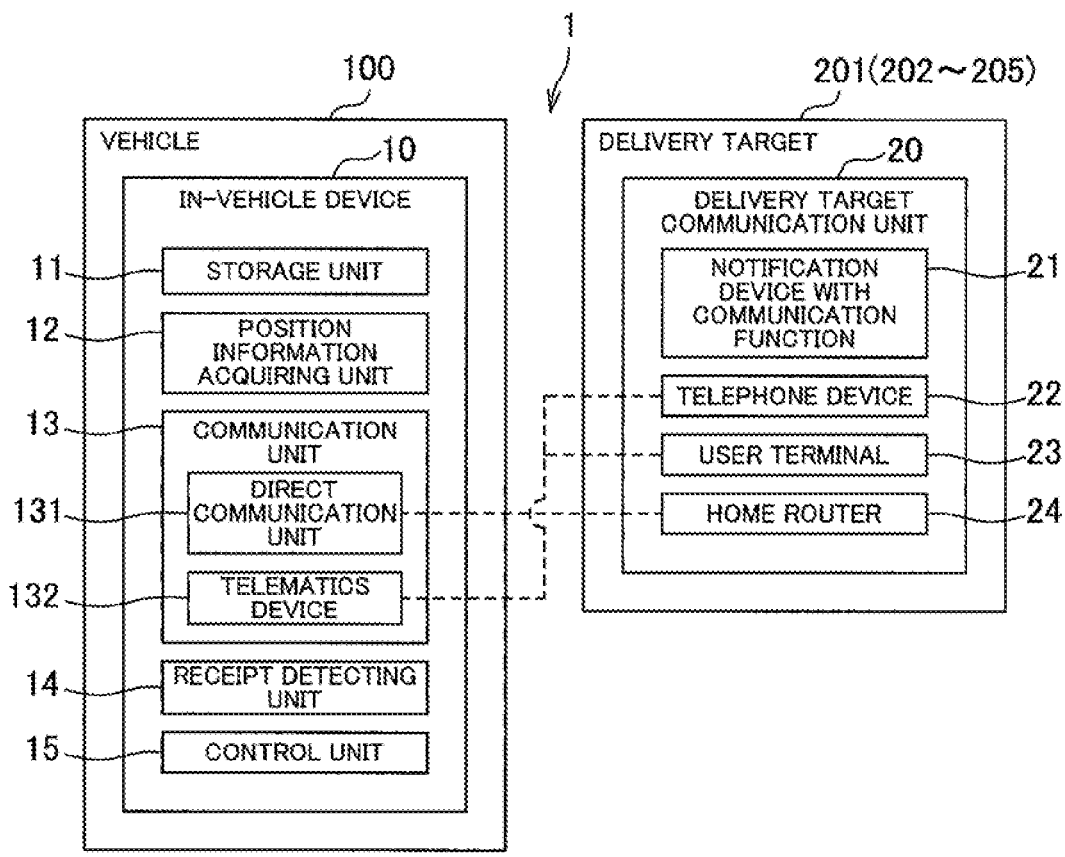
FIG. 1. is a schematic structural view illustrating an arrival notification system according to an embodiment of the present invention.
Figure 2:
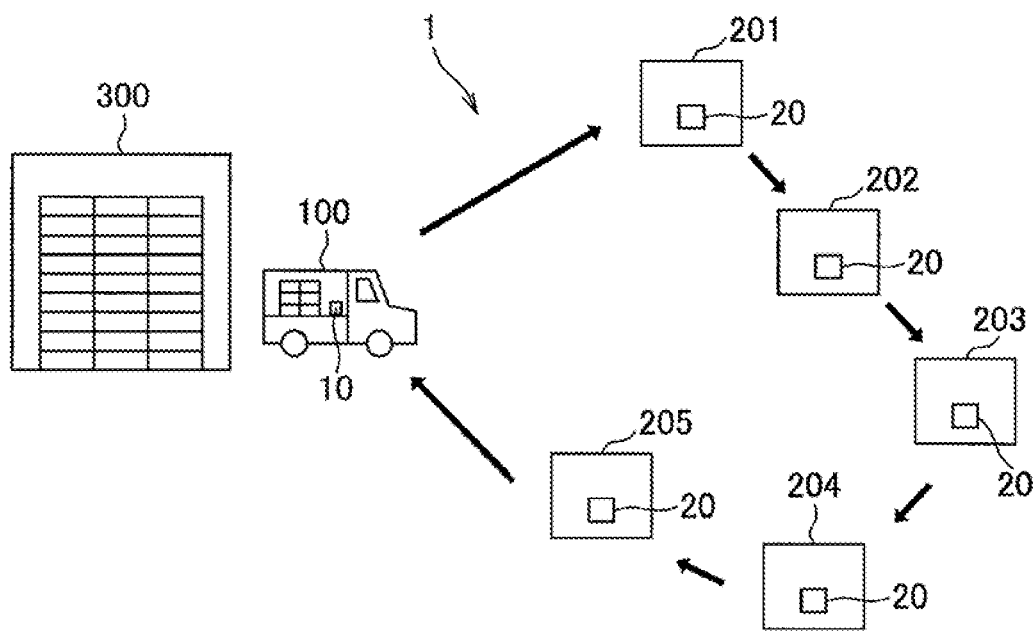
FIG. 2. is a schematic view illustrating a travel route of a vehicle equipped with an in-vehicle device of the arrival notification system.

Hereinafter, an embodiment of the present invention shall be explained with reference to the drawings. As indicated in FIGS. 1 and 2, an arrival notification system 1 according to the present embodiment includes an in-vehicle device 10 on board of a vehicle 10 for delivery, and a delivery target communication unit (destination communication unit) 20 provided at each of multiple delivery targets (destinations) 201-205, wherein the in-vehicle device 10 is provided for notifying users at each of the delivery targets 201-205 of arrival of the vehicle 10 when goods are delivered by the vehicle 100 to the delivery targets 201-205 successively.

The in-vehicle device 10 includes a storage unit 11, a position information acquiring unit 12, a communication unit 13, a receipt detecting unit 14 and a control unit 15.

The storage unit 11 is configured to store delivery target information (destination information). The delivery target information includes e.g. a delivery target address, network connection information of a notification device with a communication function 21 as explained below (e.g. SSID (Service Set Identifier), a telephone number of the delivery target, an e-mail address of the delivery target, and weight of goods to be delivered. It is to be noted that delivery target information of all the delivery targets 201-205 may be stored in the storage unit 11 before the vehicle 100 leaves a delivery center 300, or only delivery target information of a first delivery target 201 is stored in the storage unit 11 in advance and after arriving at the first delivery target 201, delivery target information of the next delivery target 202 is acquired by accessing a database and stored in the storage unit 11, wherein this process may be repeated for each arrival at each delivery target.

Further, at the delivery center 300, the delivery target information may be forwarded from the database to the storage unit 11. And after leaving, this may be accomplished via wireless communication.

The position information acquiring unit 12 is provided for acquiring own position information (actual position information of the vehicle 100) and constituted e.g. from a GPS receiving unit for receiving electromagnetic radiation emitted from multiple GPS (Global Positioning Systems) satellites. This means that it can be determined that the vehicle 100 has arrived at the delivery targets 201-205 based on the delivery target addresses and the position information of the vehicle.

The communication unit 13 includes a direct communication unit 131 and a telematics device 132. The direct communication unit 131 is e.g. a WiFi (registered trademark) communication unit and configured to be capable of communicating with the notification unit 21 via a home router 24 as described below. It is to be noted that the direct communication unit 131 may be configured to communicate according to other communication standards.

The telematics device 132 is capable of communicating with a telephone device 22 as described below via a telephone line as a telecommunication network, and capable of communicating with a user terminal 23 as described below via an Internet line as a telecommunication network.

The receipt detecting unit 14 is a weight detecting unit provided in a luggage room or a luggage carrier of the vehicle 100 or the like for detecting that goods on the vehicle 100 have been received. This means that the delivery target information includes information about weights of goods to be delivered to the respective delivery targets 201-205, wherein it may be determined that the goods have been received if reduction in a total weight by an amount substantially equal to that of the goods to be delivered is detected at each of the delivery targets 201-205. It is to be noted that the detecting method of the receipt detecting unit 14 is not limited to a weight measurement, but receipt detection of the goods may be accomplished e.g. by imaging the luggage room or the luggage carrier with a camera and detecting the luggage receipt based on the imaging result.

The control unit 15 is constituted from a CPU (Central Processing Unit) with a memory, such as a RAM (Random Access Memory) or ROM (Read Only Memory), and is responsible for entire control of the in-vehicle device 10.

Each of the deliver target communication unit 20 includes a notification device 21 with a communication function, the telephone device 22 as a communication device, the user terminal 23 as a communication device, and the home router 24. It is to be noted that the deliver target communication units 20 at the respective deliver targets 201-205 may be configured in different manners, wherein it is only required that they have at least the notification devices 21.

The notification device 21 may be any device which has e.g. a communication function and a sound generating function, such as an intercom and/or a landline telephone. The notification device 21 is provided for generating sounds and waits being ready for sound generation. Further, it is provided that the notification device 21 is connected to the home router 24 and the direct communication unit 131 is connected to a home network. Here, it is sufficient if the direct communication unit 131 and the home router 24 have the same telecommunication standard. It is to be noted that the notification device 21 and the direct communication unit 131 may also be connected directly without the home router 24.

For the home router 24, access authorization setting is possible, wherein registration of access authorization of the direct communication units 131 (e.g. MAC address setting) is performed before the vehicle 100 leaves the deliver center 300. For example, an electronic mail may be transmitted to the user in advance to provide him with information about the access authorization registration.

The telephone device 22 may be any telephone device corresponding to (associated with) a telephone number stored in the storage unit 11. It may also be a landline telephone or a portable telephone device, such as a mobile phone or a smartphone.

The user terminal 23 may be any user terminal capable of receiving electronic mails which are sent to an electronic mail address stored in the storage unit 11 (associated to such an electronic mail address), such as a mobile phone, a smartphone, a personal computer or a tablet terminal.

It is to be noted that the notification device 21, the telephone device 22 and the user terminal 23 may be constituted of three stand-alone devices, or two stand-alone devices. For example, in case of an intercom with a function of receiving electronic mails and a message displaying function, this intercom may serve as the notification device 21 and the user terminal 23. Furthermore, a mobile phone and/or a smartphone with a function of receiving electronic mails and a message displaying function may serve as the telephone device 22 and the user terminal 23.

Now, a method for delivering goods to the deliver targets 201-205 with the vehicle 100 shall be described. First, the vehicle 100 is loaded with the goods at the deliver center 300 and the deliver target information is stored in the storage unit 11. The vehicle 100 travels to the first deliver target 201 based on the deliver target address. It is to be noted that the vehicle 100 may be also an unmanned vehicle with automatic driving, or a vehicle with automatic driving and an assistant passenger, or a vehicle with manual driving and (which includes a vehicle with driving assistance).

On the way from the deliver center 300 to the deliver targets 201-205, an arrival time may be estimated based on own position information and the estimated information may be transmitted e.g. to the user terminals 23. When the vehicle 100 has arrived at the deliver target 201, the control unit 15 begins with notification process. It is to be noted that the determination whether the vehicle 100 has arrived at the deliver target 201 may be determined based on whether a position indicated by the own position information which was acquired by the position information acquiring unit 12 is within a predetermined range from the deliver target address, wherein the determination may be performed before or after the vehicle stops.

Figure 3:
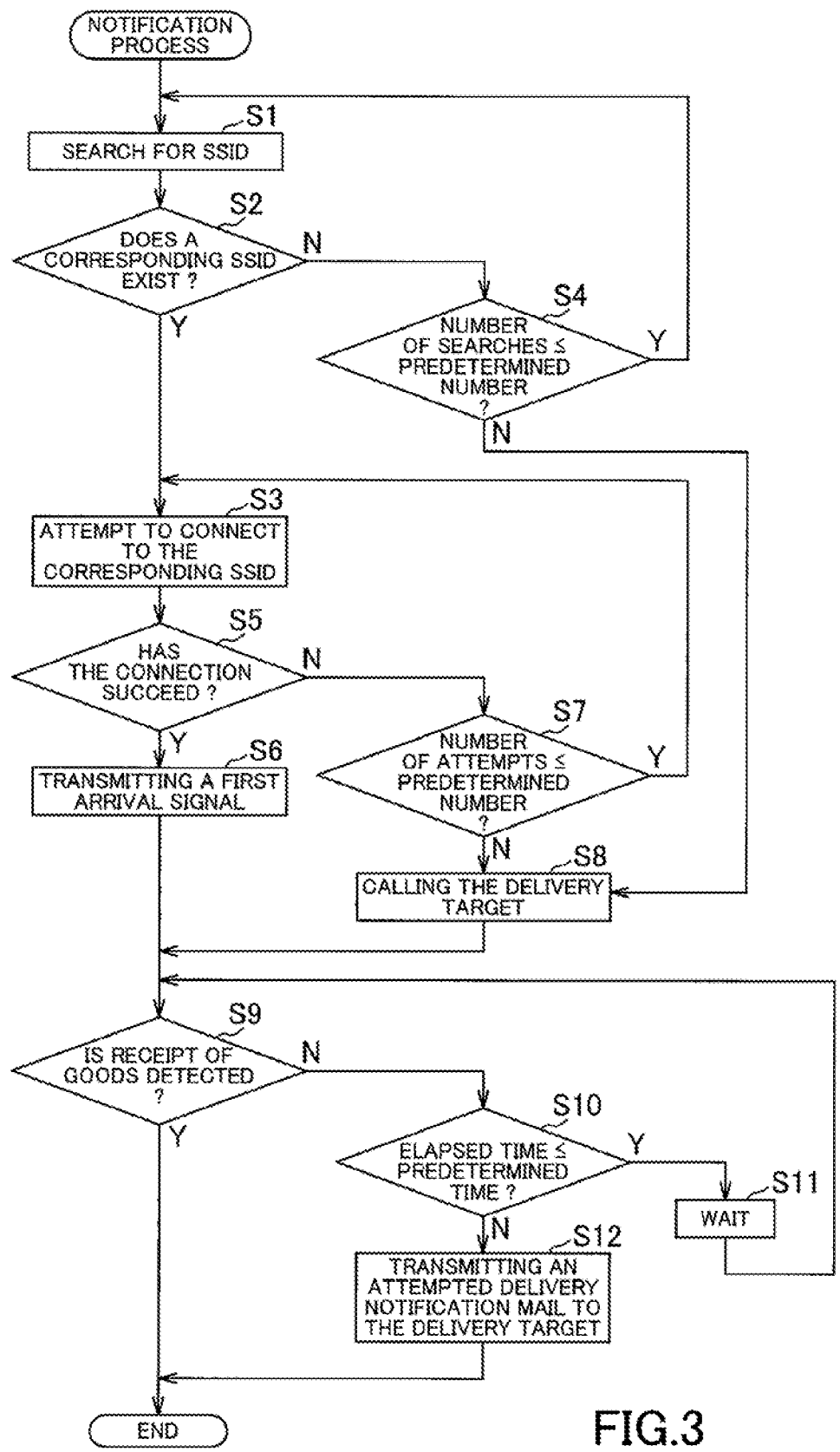
FIG. 3. is a flowchart illustrating an exemplar sequence of a notification process performed by a control unit of the in-vehicle device.

FIG. 3 shows an example for the notification process performed by the control unit 15. First, the control unit 15 searches for an SSID associated to the deliver target address by the direct communication unit 131 (step S1) and determines whether the SSID exists or not (step S2). If the SSID exists (Y in the step S2), the control unit 15 attempts connection to the home router 24 via the direct communication unit 131 (step S3). On the other hand, if the SSID does not exist (N in the step S2), the control unit 15 determines whether an accumulated number of searches is less than or equal to a predetermined number (step S4). If the number of searches is less than or equal to the predetermined number (Y in the step S4), the method returns to the step S1, wherein the search is performed again.

After the step S3, the control unit 15 determines whether the connection to the home router 24 has been completed successfully (step S5). If the connection to the home router 24 has been completed successfully (Y in the step S5), the control unit 15 causes the direct communication unit 131 to transmit a first arrival signal to the home router 24 (step S6). The first arrival signal serves for causing the notification device 21 to generate a notification sound (i.e. whistling request signal). Here, in case that the notification device 21 is an intercom, a generated sound may be same as for normal visitors, or may be specific for delivery.

If the connection to the home router 24 has not been completed successfully (N in the step S5), the control unit 15 determines whether an accumulated number of attempts for the connection is less than or equal to a predetermined number (step S7). If the number of attempts is less than or equal to the predetermined number (Y in the step S7), the method returns to the step S5, wherein the search is performed again. It is to be noted that the "predetermined number" in the step S4 may be different from the "predetermined number" in the step S7.

If the number of searches for the SSID is larger than the predetermined number (N in the step S4), and if the number of attempts for connection to the home router 24 is larger than the predetermined number (N in the step S7), the control unit 15 dials a telephone number for the deliver target 201 with the telematics device 132 (step S8). Then, when the telephone device 22 at the deliver target 201 is in a connected state, an automatic message is played which notifies that the vehicle 100 has arrived. Thus, in communication with the telephone device 22 as a communication device by means of the telematics device 132, a telephone call and sending an automatic message signal correspond to sending a second arrival signal.

After the steps S6, S8, the control unit 15 determines whether receipt of the good has been detected by the receipt detecting unit 14 (step S9). If the receipt of the goods has been detected (Y in the step S9), the control unit 15 ends the notification process and the vehicle 100 begins with driving to a next deliver target 202.

On the other hand, if the receipt of the goods has not been detected (N in the step S9), an elapsed time after sending the first arrival signal or after calling the deliver target 201 is within a predetermined time (step S10). If the elapsed time is within the predetermined time (Y in the step S10), the method returns to the step S9 after a waiting time has been elapsed (step S11), wherein the control unit 15 performs the detection again.

If the elapsed time is longer than the predetermined time (N in the step S10), the control unit 15 causes the telematics device 132 to send an attempted delivery notification mail to the electronic mail address of the deliver target 201 (step S12) and ends the notification process, wherein the vehicle 100 then begins with driving to a next deliver target 202. Thus, in sending the attempted delivery notification mail from the telematics device 132 to the electronic mail address of the delivery target 201, this attempted delivery notification mail is reviewable for the user terminal 23 and corresponds to an attempted delivery information signal.

It is to be noted that, if the telephone device 22 does not get connected upon calling in the step S8, it may also proceed to the step S12, wherein the attempted delivery notification mail may be sent.

The control unit 15 of the in-vehicle device 10 performs the above-described notification process for each arrival of the vehicle 100 at the subsequent deliver targets 202-205. Further, when the notification process has been completed at the last delivery target 205, the vehicle 100 travels to the delivery center 300.

With the present embodiment as described above, the following effects can be achieved: the arrival of the vehicle 100 can be easily recognized by users by causing the notification device 21 to generate the notification sound when the vehicle 100 arrives at each of the deliver targets 201-205. I.e., this can cause the notification device 21 to generate the notification sound more easily and it can be recognized by users more easily than an arrival notification method by merely sending an electronic mail.

Furthermore, due to the communication unit 13 having the telematics device 132 and being capable of communicating with the telephone device 22 and the user terminal 23, users can be notified of the arrival with other methods even if communication with the notification device 21 has been failed.

Moreover, an arrival history of the vehicle 100 at the deliver targets 201-205 can be provided to users as well by sending the attempted delivery notification mail in case that receipt of the goods at the deliver targets 201-205 is not detected, which can facilitate e.g. a smooth request for redelivery.

It is to be noted that the present invention is not limited to the above-described embodiments, but also includes further embodiments which can achieve the objective of the present invention, which also includes variations as shown below:

For example, the above-described embodiment is provided so that if connection to the home router 24 has been failed, the telephone device 22 is called in the step S8, and if receipt of the goods is not detected, the attempted delivery notification mail is sent in the step S12. However, in case that the delivery target information does not include a telephone number of the delivery target, the step S8 may be omitted, and in case that the delivery target information does not include an electronic mail address of the delivery target, the step S12 may be omitted. Furthermore, in case that the notification device 21 and/or the telephone device 22 have the message receiving function and the display function, the attempted delivery notification mail may be sent to them. Moreover, in case that the telephone device 22 has a voice recording function, voice information for the attempted delivery notification may be sent instead of the attempted delivery notification mail.

Furthermore, while the above-described embodiment is provided so that the vehicle 100 for delivery is equipped with the in-vehicle device 10, the in-vehicle may be provided on a guest transport vehicle. For example, in case that the vehicle goes around with unmanned driving to a plurality of pickup/destination place and then to a final destination, it is also possible that the notification device generates the notification sound by transmitting the first arrival signal upon arrival at a predetermined pickup/destination place from the communication unit to the notification unit of this pickup/destination place.

Although a further best configuration, method etc. for implementing the present invention are disclosed in the above description, the present invention is not limited thereto. Namely, while the present invention is particularly shown and described mainly with regard to the specific embodiments, the above mentioned embodiments may be modified in various manners in shape, material characteristics, amount or other detailed features without departing from the scope of the technical idea and purpose of the present invention. Therefore, the description with limited forms, material characteristics etc. according to the above disclosure is not limiting the present invention, but merely illustrative for easier understanding the present invention so that the description using names of the elements without a part or all of the limitations to their forms, material characteristics etc. is also included in the present invention.

REFERENCE SIGNS LIST

1 Notification system
10 In-vehicle device
11 Storage unit

12 Position information acquiring unit
13 Communication unit
14 Receipt detecting unit
15 Control unit
21 Notification unit with communication function
22 Telephone device (communication device)
23 User terminal (communication device)
100 Vehicle
201-205 Delivery targets

What is claimed is:

1. An in-vehicle device provided in a vehicle, the in-vehicle device comprising:
    a storage unit for storing destination information;
    a position information acquiring unit for acquiring position information of the vehicle;
    a communication unit capable of communicating with a notification device located at a destination; and
    a processor configured to:
    when the vehicle arrives at a predetermined destination, search for an address of a router of a local area network associated with the predetermined destination;
    receive access authorization for the router of the local area network associated with the predetermined destination;
    connect the communication unit of the in-vehicle device directly to the router of the local area network of the predetermined destination based on the access authorization for the router; and
    cause the communication unit to transmit a first arrival signal to the notification device of the predetermined destination through the router of the local area network to generate a notification sound, while the communication unit of the in-vehicle device is directly connected to the router of the local area network of the predetermined destination,
    wherein the communication unit is configured to communicate with a communication device associated with the destination information of the predetermined destination via a telecommunication network,
    wherein the in-vehicle device further comprises a sensor configured to detect a movement of a delivery item between the vehicle and the predetermined destination or the vehicle and a recipient at the predetermined destination,
    wherein the processor determines that the delivery item on the vehicle has been received based on the movement detected by the sensor, and
    wherein, if receipt of the delivery item is not determined after a predetermined time has elapsed since the first arrival signal was transmitted, the processor is further configured to cause the communication unit to transmit an attempted delivery information signal to the communication device.

2. The in-vehicle device according to claim 1,
    wherein, when communication with the notification device is not possible, the processor is further configured to cause the communication unit to transmit a second arrival signal to the communication device associated with the destination information of the predetermined destination.

3. An arrival notification system comprising:
    the in-vehicle device according to claim 1; and
    the notification device located at the destination.

4. The in-vehicle device of claim 1,
    wherein the local area network is a home network.

5. The in-vehicle device of claim 4, wherein the information about registration of the access authorization is transmitted in advance of the vehicle reaching the predetermined destination.

6. The in-vehicle device according to claim 2,
    wherein, if receipt of the goods is not detected after a predetermined time has elapsed since the second arrival signal was transmitted, the processor is further configured to cause the communication unit to transmit an attempted delivery information signal to the communication device.

7. An arrival notification system comprising:
    the in-vehicle device according to claim 2; and
    the notification device located at the destination.

8. An arrival notification system comprising:
    the in-vehicle device according to claim 6; and
    the notification device located at the destination.

9. An arrival notification method performed by an in-vehicle device provided in a vehicle, the method comprising:
    storing destination information;
    acquiring position information of the vehicle; when the vehicle arrives at a predetermined destination;
    searching for an address of a router of a local area network associated with the predetermined destination;
    receiving access authorization for the router of the local area network associated with the predetermined destination;
    connecting a communication unit of the in-vehicle device directly to the router of the local area of the predetermined destination based on the access authorization for the router;
    causing the communication unit to transmit a first arrival signal to the notification device of the predetermined destination through the router of the local area network to generate a notification sound, while the communication unit of the in-vehicle device is directly connected to the router of the local area network of the predetermined destination;
    detecting, by a sensor, a movement of a delivery item between the vehicle and the predetermined destination or the vehicle and a recipient at the predetermined destination,
    determining that delivery item on the vehicle has been received based on the detecting by the sensor; and
    if receipt of the delivery item is not determined after a predetermined time has elapsed since the first arrival signal was transmitted, causing the communication unit to transmit an attempted delivery information signal to a communication device associated with the destination information of the predetermined destination, wherein the communication device is configured to communicate with the communication unit via a telecommunication network.

10. The arrival notification method of claim 9,
    wherein the local area network is a home network.

11. The arrival notification method of claim 10, wherein information about registration of the access authorization is transmitted in advance of the vehicle reaching the predetermined destination.

* * * * *